(12) United States Patent
Ko

(10) Patent No.: US 11,060,710 B2
(45) Date of Patent: Jul. 13, 2021

(54) POWER SUPPLY DEVICE OF LIGHTING DEVICE FOR VEHICLE INCLUDING PLURALITY OF UNIT LIGHTING MODULES

(71) Applicant: VISION X ASIA CO., LTD., Hwaseong-si (KR)

(72) Inventor: In Hong Ko, Seoul (KR)

(73) Assignee: VISION X ASIA CO., LTD., Hwaseong-si (KR)

( * ) Notice: Subject to any disclaimer, the term of this patent is extended or adjusted under 35 U.S.C. 154(b) by 59 days.

(21) Appl. No.: 16/731,643

(22) Filed: Dec. 31, 2019

(65) Prior Publication Data

US 2021/0010667 A1 Jan. 14, 2021

(30) Foreign Application Priority Data

Jul. 10, 2019 (KR) .................. 10-2019-0083453

(51) Int. Cl.
| | | |
|---|---|---|
| H01R 12/00 | (2006.01) | |
| F21V 23/06 | (2006.01) | |
| B60Q 1/00 | (2006.01) | |
| H01R 13/11 | (2006.01) | |
| H01R 31/06 | (2006.01) | |
| F21Y 115/10 | (2016.01) | |
| H01R 12/71 | (2011.01) | |
| H01R 13/04 | (2006.01) | |

(52) U.S. Cl.
CPC ............ *F21V 23/06* (2013.01); *B60Q 1/0064* (2013.01); *H01R 13/11* (2013.01); *H01R 31/06* (2013.01); *F21Y 2115/10* (2016.08); *H01R 12/714* (2013.01); *H01R 13/04* (2013.01)

(58) Field of Classification Search
CPC ...... F21V 23/00; F21V 23/06; F21Y 2115/10; B60Q 1/0064; H01R 13/11; H01R 13/04; H01R 12/714; H01R 31/06
USPC ............................................... 439/36, 55, 56
See application file for complete search history.

(56) References Cited

U.S. PATENT DOCUMENTS

| 9,644,828 B1 * | 5/2017 | May .......................... F21S 8/04 |
| 2020/0232613 A1 * | 7/2020 | Lauck ....................... F21S 8/06 |
| 2020/0256735 A1 * | 8/2020 | Owens ..................... F21V 29/70 |

FOREIGN PATENT DOCUMENTS

| JP | 2002245812 | 8/2002 |
| JP | 2009289650 | 12/2009 |
| KR | 100699690 | 3/2007 |
| KR | 20110111135 | 10/2011 |
| KR | 101411206 | 6/2014 |

(Continued)

*Primary Examiner* — Kheim M Nguyen
(74) *Attorney, Agent, or Firm* — Cantor Colburn LLP

(57) ABSTRACT

Provided is a power supply device for a lighting device for a vehicle composed of a plurality of unit lighting modules which is easy to install and disassemble due to excellent assembly capabilities, and which stably supplies power with excellent connection stability. In the power supply device for supplying power to the lighting device for the vehicle composed of a plurality of unit lighting module, the power supply device includes: a connection rail member provided in each unit lighting module to supply power to a PCB of the unit lighting module; and a connection pin member electrically coupled to the connection rail member in a male and female manner to electrically connect two adjacent power supply modules to each other.

5 Claims, 8 Drawing Sheets

(56) References Cited

FOREIGN PATENT DOCUMENTS

| | | |
|---|---|---|
| KR | 20140135540 | 11/2014 |
| KR | 101477793 | 12/2014 |

\* cited by examiner

POWER SUPPLY DEVICE OF LIGHTING DEVICE FOR VEHICLE INCLUDING PLURALITY OF UNIT LIGHTING MODULES

BACKGROUND OF THE INVENTION

Field of the Invention

The present invention relates to a power supply device for supplying power to a lighting device for a vehicle composed of a plurality of unit lighting modules for easy compatibility and maintenance. More particularly, the present invention relates to a power supply device for a lighting device for a vehicle composed of a plurality of unit lighting modules which is easy to install and disassemble due to excellent assembly capabilities, and which stably supplies power with excellent connection stability.

Description of the Related Art

Generally, a lighting device is installed at the front and rear of a vehicle to secure driver's field of vision and transmit a signal.

The lighting device installed at the rear of the vehicle includes brake lights, direction indicators, and the like. Also, the lighting device installed at the front of the vehicle includes direction indicators, headlamps, fog lights, and the like.

In recent years, as a light source for the lighting device for the vehicle, eco-friendly LEDs are spreading rapidly, having low power consumption, semi-permanent lifespan, and high illuminance.

As the related art with respect to the lighting device for the vehicle using LEDs as the light source, Korean Patent No. 10-0699690 "LIGHTING DEVICE OF AN AUTOMOBILE USING LED", Korean Patent No. 10-1411206 "LED LIGHTING DEVICE FOR VEHICLE", Korean Patent No. 10-1477793 "LIGHTING DEVICE OF CAR", and the like are disclosed.

According to the related art, the lighting device for the vehicle using LEDs includes a housing, and LED modules embedded in the housing.

The lighting devices for the vehicle according to the related art are predetermined in shape and size, so the lighting devices may only be installed and used in dedicated vehicles. Accordingly, when one or more of LEDs installed on a PCB break down, a problem regarding resource waste occurs because all of the LED modules must be replaced. Moreover, a problem that the lighting pattern looks monotonous occurs due to usually using one kind of lighting pattern.

SUMMARY OF THE INVENTION

The present invention is devised in order to solve the problems of a limitation that the lighting device for the vehicle according to the related art should be installed and used just in predetermined vehicles, and a waste of resources because the entire lighting device should be replaced in the event of a breakdown thereof, and the objective of the present invention is to provide a power supply device of a lighting device for a vehicle composed of a plurality of unit lighting modules; wherein the lighting device is provided by combining a plurality of unit lighting modules, so that the lighting device is adjustable in size and shape, and thereby being able to be installed in a variety of vehicles; and only the unit lighting module having a breakdown thereof may be replaced so as to develop the lighting device for the vehicle with excellent economy; and wherein, the assembly of the plurality of unit lighting modules is excellent as described above thus being suitable for the lighting device composed of the plurality of unit lighting modules, so that installation, disassembly, and maintenance work is efficient and the power may be stably supplied.

In order to achieve the objective of the present invention, there is provided a power supply device for supplying power to a lighting device for a vehicle composed of a plurality of unit lighting modules, the power supply device including: a connection rail member provided in the each unit lighting module to supply the power to a PCB of the unit lighting module; and a connection pin member coupled to the connection rail member in a male and female manner and electrically connecting two adjacent power supply modules to each other.

In addition, the power supply device may further include: a rear cover coupled to a body of the unit lighting module and having the connection rail member embedded therein; and a connection board provided on the rear cover and electrically connecting the connection rail member and the PCB to each other.

The connection rail member may be provided with an insertion hole in which the connection pin member is inserted and coupled in the male and female manner, and an incised part may be provided in the insertion hole in a longitudinal direction so that the connection rail member and the connection pin member are in close contact with each other by elastic force.

The power supply device may further include a dummy housing to which a power cable for supplying the power through the connection pin member is connected.

The dummy housing may be connected to a communication cable for communicating a control signal through the connection pin member.

In the power supply device of the lighting device for the vehicle composed of a plurality of unit lighting modules according to the present invention, since the connection pin member may be easily and quickly assembled and disassembled in a male and female manner to the connection rail member provided in two adjacent unit lighting modules, the installation, disassembly, and maintenance work of the lighting device for the vehicle is quick and convenient; and since electrical connections between the connection rail member and the connection pin member, and between the connection rail member and the connection board are maintained in close contact by elastic force, as a product with excellent power supply stability, the power supply device is very useful for industrial development.

DETAILED DESCRIPTION OF THE INVENTION

Figure 1:
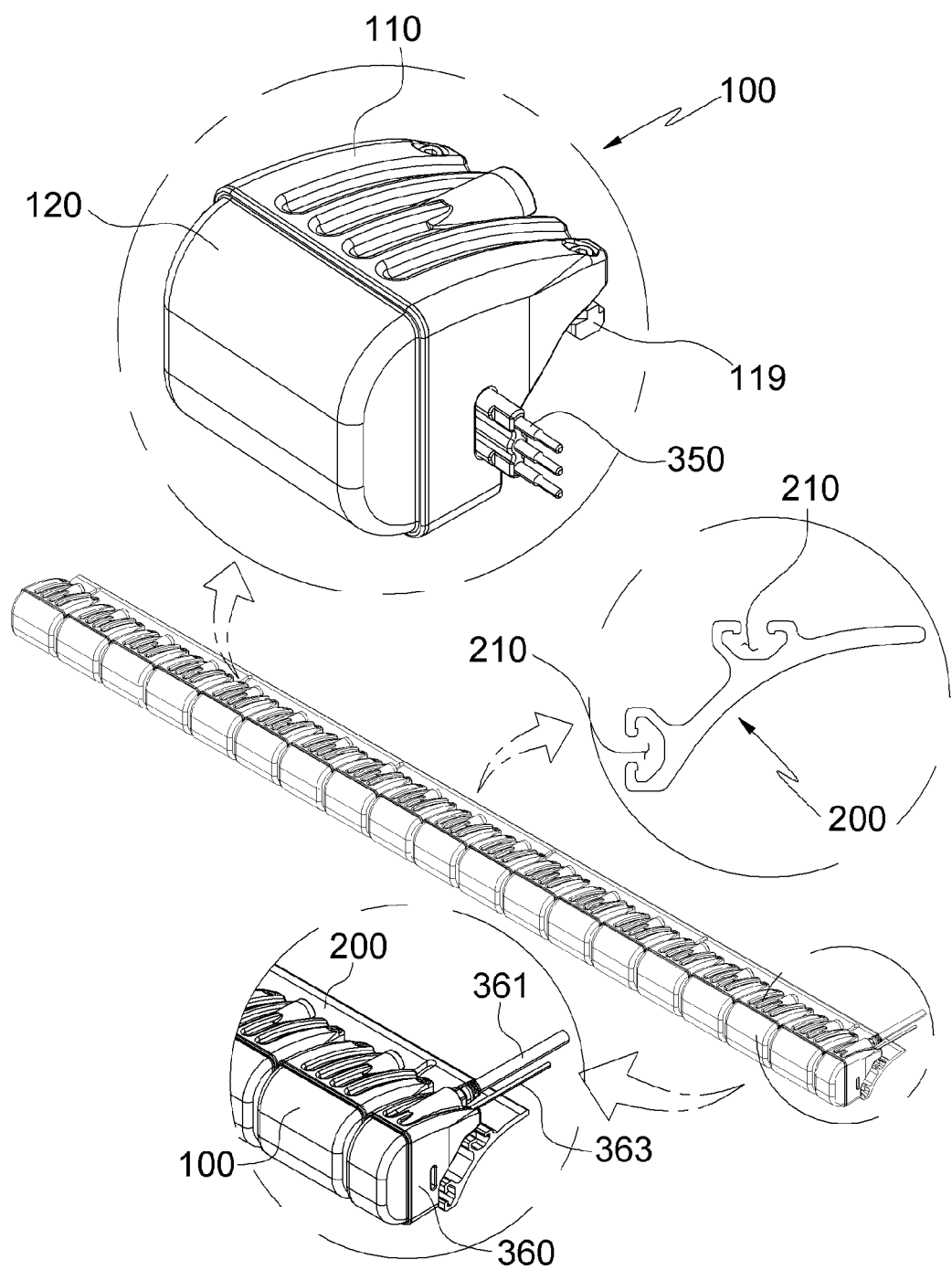
FIG. 1 is a perspective view of a lighting device for a vehicle according to one example of the present invention.
Figure 2:
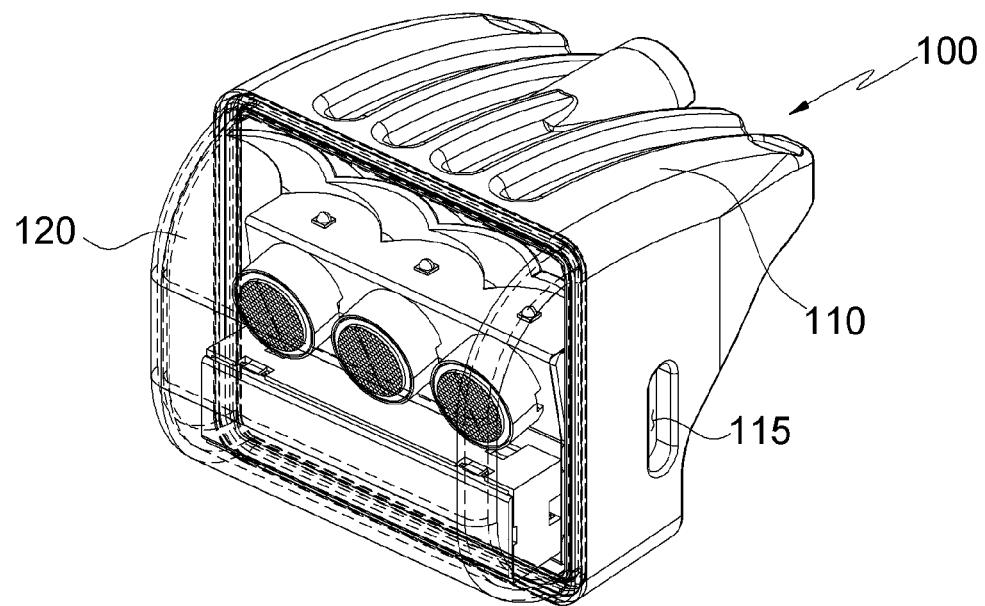
FIG. 2 is a perspective view of a unit lighting module.
Figure 2:
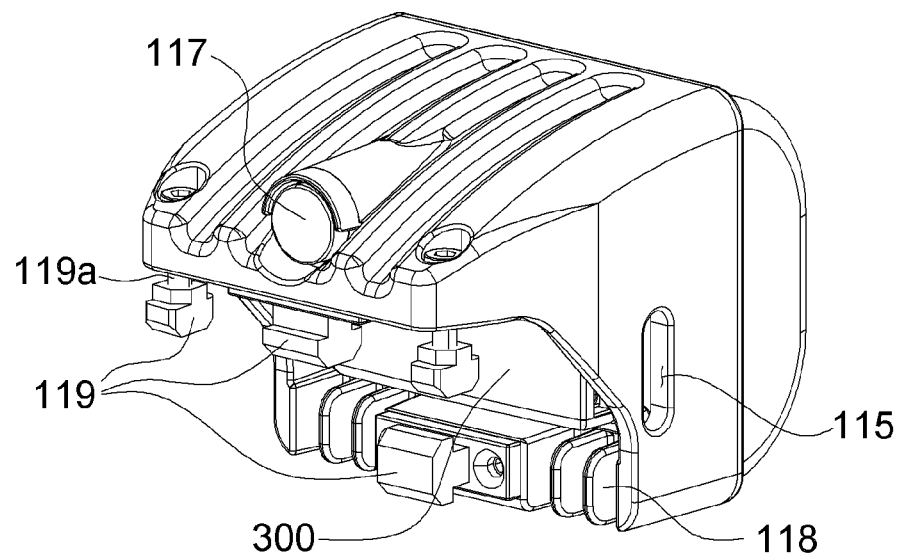
Figure 3A:
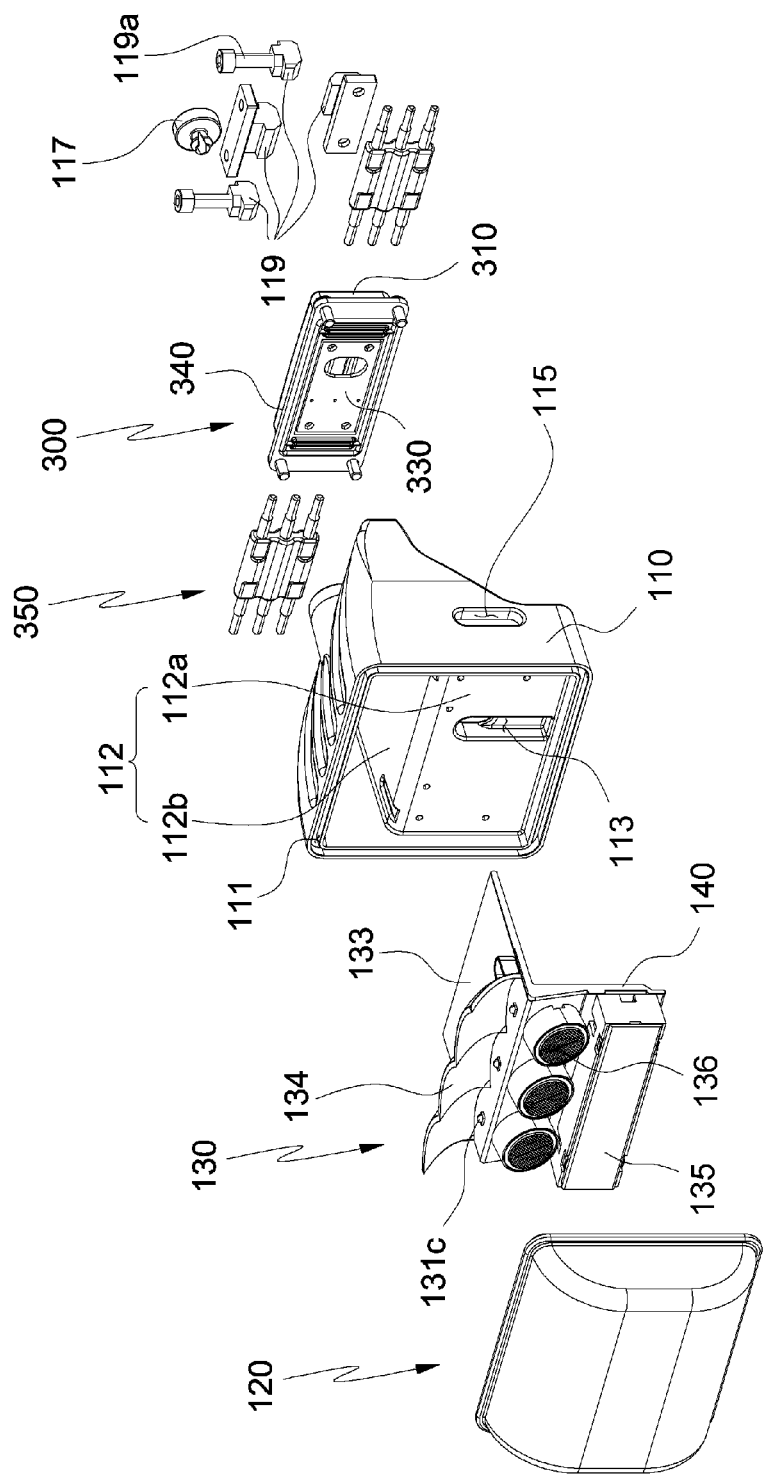
FIGS. 3A and 3B are exploded perspective views of the unit lighting module.
Figure 3B:
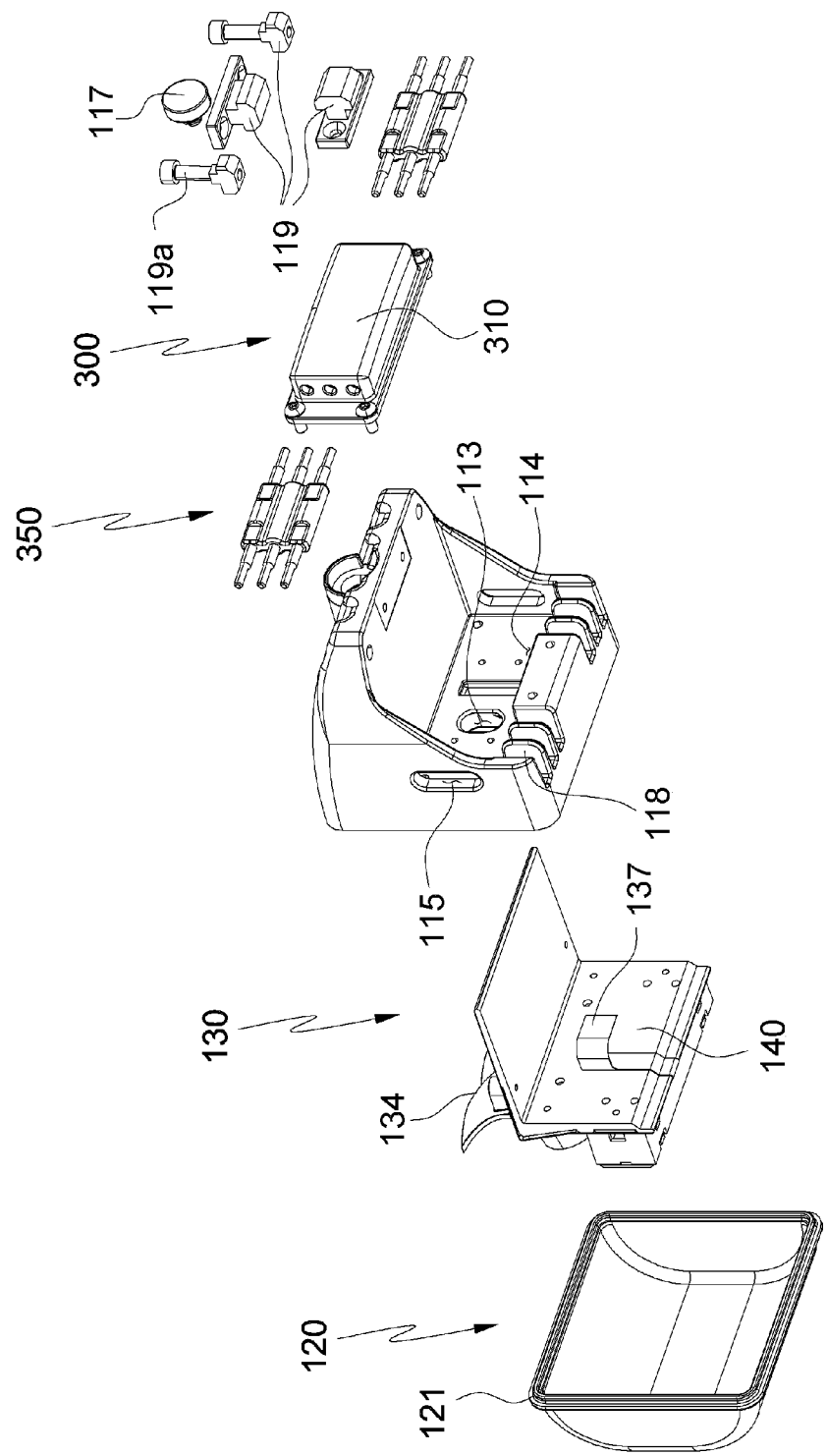
Figure 4:
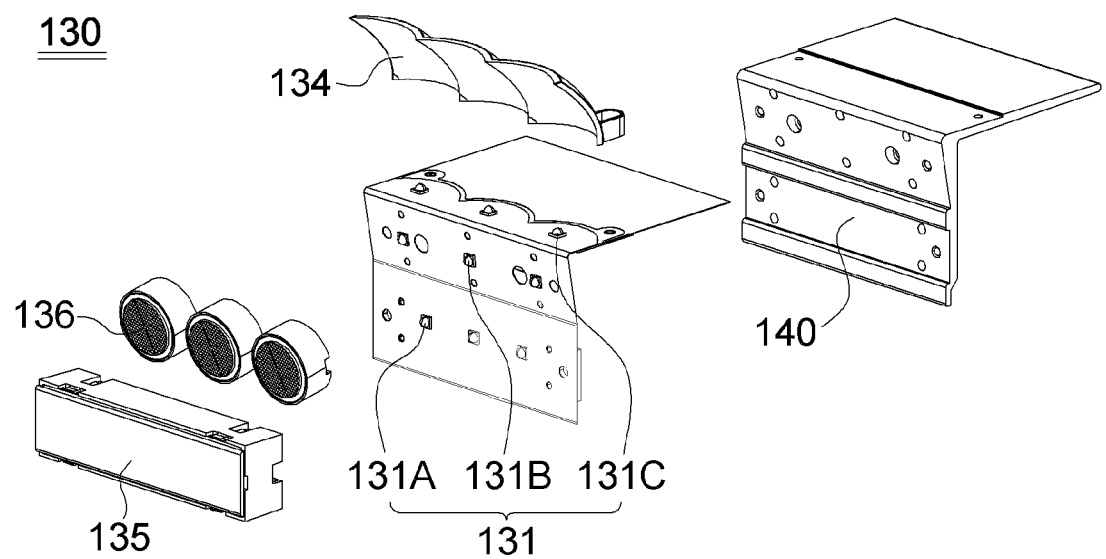
FIG. 4 is an exploded perspective view of a LED module.
Figure 5:
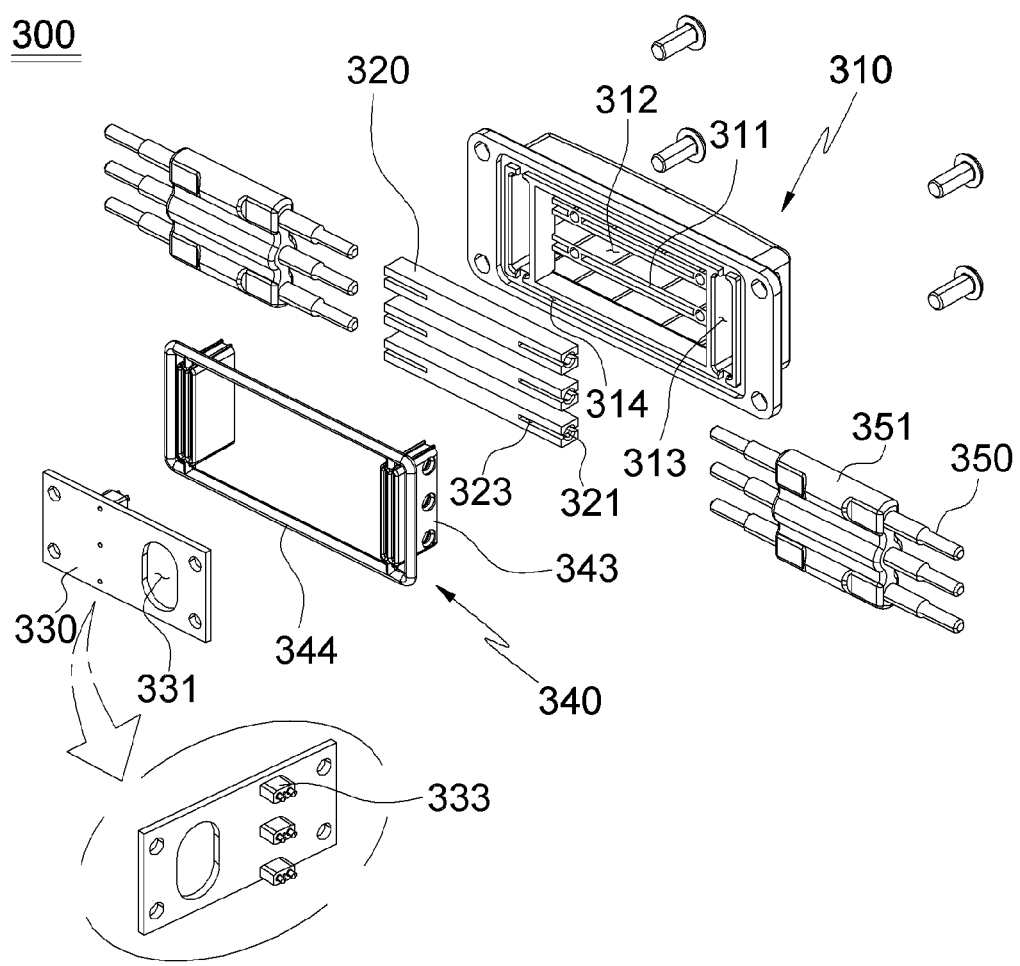
FIG. 5 is an exploded perspective view of a power supply module.
Figure 6:
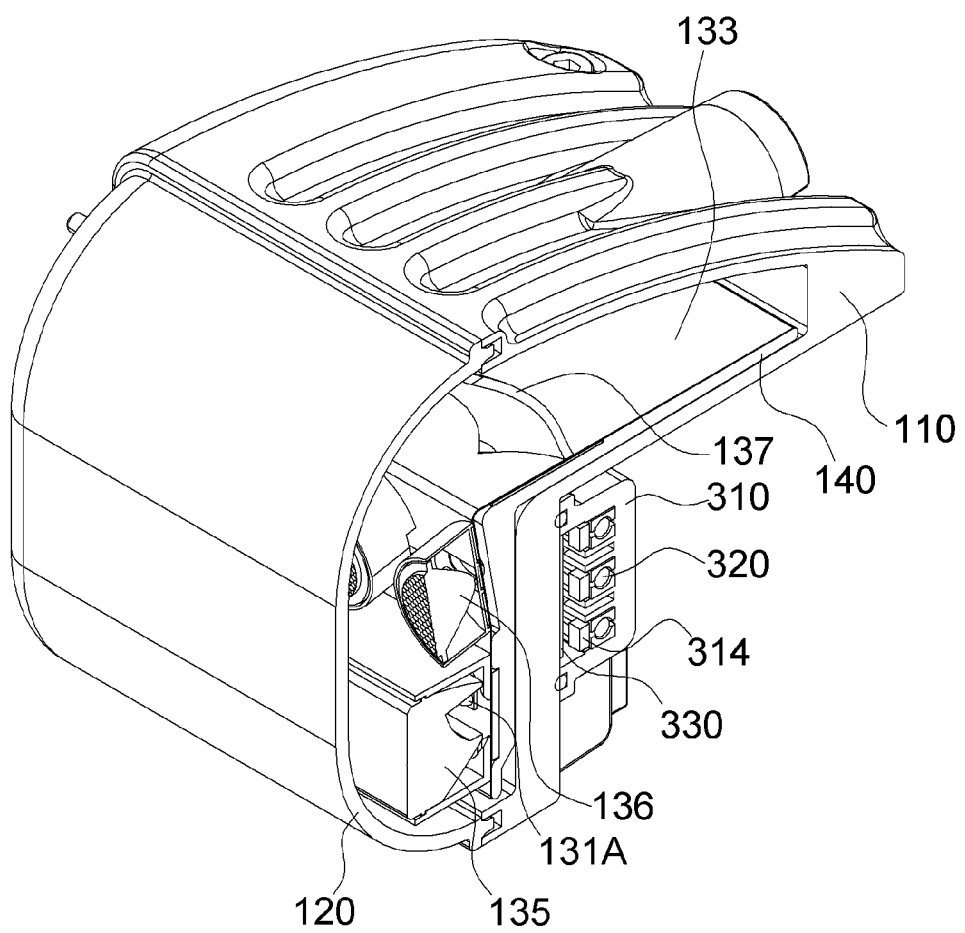
FIG. 6 is a partially cutaway perspective view of the unit lighting module.
Figure 7:
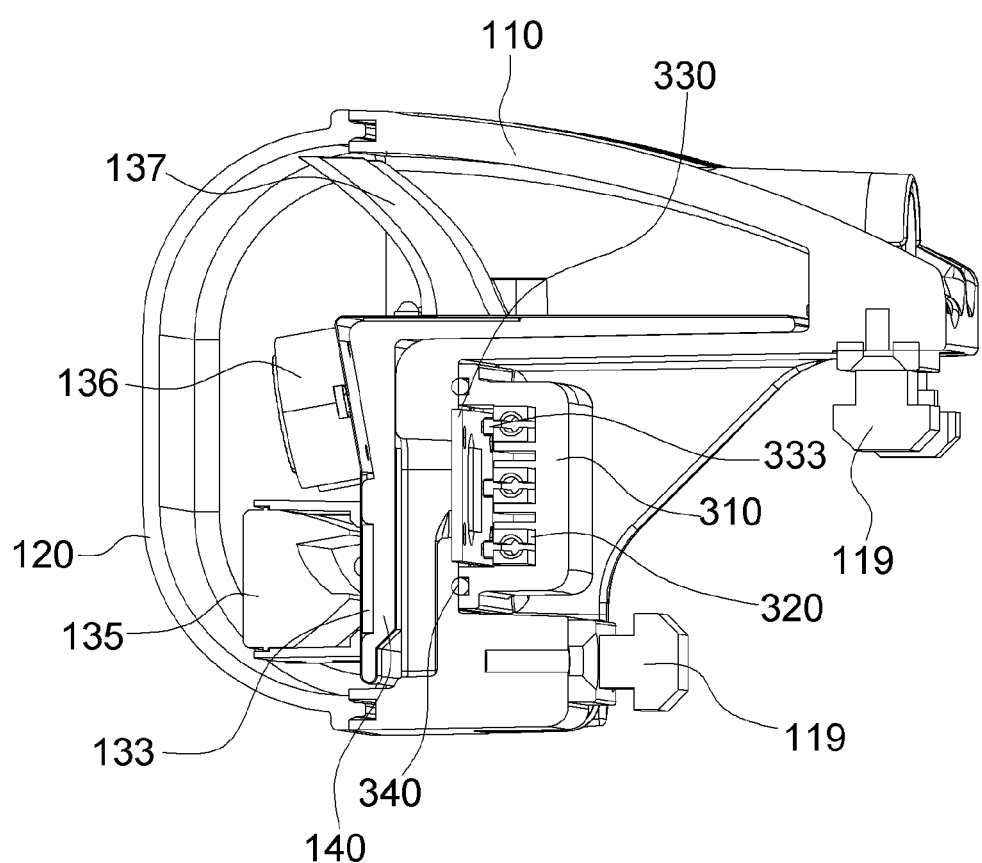
FIG. 7 is a partially cutaway perspective view of the unit lighting module.

Hereinafter, a lighting device for a vehicle according to the present invention will be described in more detail with reference to the accompanying drawings.

As shown in the drawings, the lighting device for the vehicle according to the present invention includes a plurality of unit lighting modules 100, a bracket 200, and a plurality of power supply modules 300.

The unit lighting module 100 includes a body 110, a front cover 120, an LED module 130, and the like.

The body 110 has the LED module 130 and the like embedded therein. The front cover 120 covers the front of the body 110 and is made of a transparent material so that light being emitted from the LEDs 131A, 131B, and 131C is transmitted to illuminate the front of the body.

An assembly groove 111 is provided at the front surface edge of the body 110. At the rear surface edge of the front cover 120, an assembly protrusion 121 is provided to be inserted into the assembly groove 111.

The contacting area between the body 110 and the front cover 120 may be preferably sealed and bonded with silicone resin to increase the waterproofness so that moisture does not infiltrate through the bonding gap therebetween. Also, when necessary, the body 110 and the front cover 120 may be coupled with bolts to increase the coupling force.

The body 110 is provided with a support wall 112 having an inverted 'L' like shape and composed of a vertical part 112a and a horizontal part 112b.

On the vertical part 112a of the support wall 112, a connection hole 113 is provided to electrically connect the PCB 133 of the LED module 130 and the power supply module 300 to each other. On the outer surface of the vertical part 112a, a seating groove 114 is provided, on which the power supply module 300 is seated. On sidewalls of both sides forming the seating groove 114, penetrating holes 115 are provided through which connection pin members 350 electrically connect adjacent power supply modules 300. At the rear upper side of the body 110, a vent hole 116 is provided, and a one-way filter 117 is coupled to the vent hole 116.

The one-way filter 117 blocks outside air (including moisture) from infiltrating into the body 110, and enables the air inside the body 110 to be easily discharged to the outside, so that the inside of the body 110 is kept in a dry state.

The LED module 130 includes a PCB 133 and a plurality of LEDs 131A, 131B, and 131C installed on the PCB 133.

The PCB 133 has an inverted 'L' like shape composed of an upper surface and a front surface so as to be supported by the support wall 112 of the body 110. On the front surface of the PCB 133, the first LEDs 131A and the second LEDs 131B, which are each composed of three LEDs, are arranged in two rows. On the upper surface of the PCB 133, three third LEDs 131C are arranged in a row.

On the upper surface of the PCB 133, a reflector 134 which reflects forward the light being emitted from the third LEDs 131C, is installed. The first LEDs 131A arranged on the front surface of the PCB 133 are covered with the first lens 135 that refracts light being emitted, and illuminates with the light. The second LEDs 131B are also covered with the second lens 136 that refracts the light being emitted, and illuminates with the light. Since the refractive characteristics of the first lens 135 and the second lens 136 are different, the lighting patterns of the light passing through these lenses by refraction are different.

The first LEDs 131A and the first lens 135, the second LEDs 131B and the second lens 136, and the third LEDs 131C and the reflector 134 have different lighting patterns so that the unit lighting modules 100 may be illuminated with three different lighting patterns. Also, a combination of lighting and turning off the first to third LEDs 131A, 131B, and 131C may be illuminated with a total of seven types of lighting patterns (a state in which all the LEDs are turned off is excluded from the lighting patterns). In addition, since each of the first to third LEDs 131A, 131B, and 131C is composed of three LEDs, a variety of lighting patterns may be illuminated by combining the colors of light being emitted from each of the three LEDs.

The PCB 133 of the LED module 130 is provided with various electronic elements constituting an LED driver for controlling the driving of the LEDs 131A, 131B, and 131C, and is also provided with various electronic elements constituting a communication driver for processing command signals.

The rear surface of the PCB 133 of the LED module 130 is provided with a tension connecting plate 137 which is in close contact with and connected to the power supply module 300 by elastic force.

A heat sink panel 140 is attached to the rear surface of the PCB 133 to absorb heat generated and more efficiently release the heat to the outside through the body 110. The heat sink panel 140 is coupled to the support wall 112 of the body 110 by bolts to be in close contact therewith.

The body 110 is made of aluminum material having excellent thermal conductivity so that the heat transferred from the heat sink panel 140 may be quickly discharged to the outside. Also, on the outer surface of the body 110, a heat dissipation blade 118 may be provided to increase the heat dissipation efficiency by increasing the contacting area with the outside air.

The plurality of unit lighting modules 100 are installed on the bracket 200 in succession. The bracket 200 is provided with an installation part on which the unit lighting modules 100 are installed. The installation part may be provided in one row, or may be provided in multiple rows. Also, the installation parts having multiple rows may be arranged in a flat plane structure, or may be arranged in a round plane structure.

Thus, as shown in the drawing, the unit lighting modules 100 may be installed in a row on the bracket 200 so that the lighting device for the vehicle may be provided in a bar shape. The unit lighting modules 100 may be installed on the bracket 200 in multiple of rows so that the lighting device for the vehicle may be provided in a rectangular shape. The unit lighting modules 100 may also be installed on the bracket 200 in multiple rows, but may be provided in a circular or elliptical shape by adjusting the quantity of the unit lighting modules 100 arranged in each row. In addition, when the unit lighting modules 100 are installed on the bracket 200 in multiple rows, the unit lighting modules 100 may be arranged on a flat plane or a round plane, so that the lighting device may be configured to have the flat plane structure or the round plane structure.

The installation part is provided in a slide groove 210 provided in the longitudinal direction on the bracket 200 so that the unit lighting modules 100 may be easily assembled and coupled to the installation part of the bracket 200. Also, the rear of the body 110 is provided with a slide block 119 which is slidably coupled to the slide groove 210.

The slide groove 210 of the bracket 200 is provided in two rows on both the upper and lower sides, and the slide blocks 119 are also provided at the rear upper and lower parts of the body 110, respectively. The slide block 119 provided at the upper part of the body 110 is provided with a tightening pin 119a for tightly fixing the slide block 119 to the slide groove 210.

Hereinafter, the power supply device that supplies power to the plurality of unit lighting modules, namely, the power supply module 300 will be described.

The power supply module 300 includes: a rear cover 310 seated and coupled to the seating groove 114 on the rear surface of the body 110; a connection rail member 320 embedded in the rear cover 310; the connection pin member 350 coupled to the connection rail member 320 in a male and female manner so as to make a connection to another adjacent power supply module 300; and a connection board 330 for electrically connecting the connection rail member 320 and the PCB 133 provided in the body 110 to each other.

The connection rail member 320 and the connection pin member 350 are each composed of a total of three members by using two members for power supply and one member for communication (i.e. transmission of a control signal).

The rear cover 310 is coupled to the rear surface of the body 110 with bolts.

A partition 311 is provided on an inner bottom of the rear cover 310 to provide an embedding groove 312 into which the connection rail member 320 is inserted and embedded.

A block groove 313 is provided next to the embedding groove 312 of the rear cover 310, and a ring groove 314 is provided at the front surface edge of the rear cover 310.

A sealing block 343 of a gasket 340 is seated in the block groove 313, and a sealing ring 344 of the gasket 340 is seated in the ring groove 314.

The sealing ring 344 of the gasket 340 seals a gap between the rear cover 310 and the body 110, and the sealing block 343 surrounds and seals an outer surface of the connection pin member 350 being penetrated.

The connection rail member 320 has insertion holes 321 provided at both sides thereof such that the connection pin member 350 is inserted and coupled in a male and female manner. In addition, in order for the connection pin member 350 to maintain a stable contact in an easily inserted state into the insertion hole 321, and in order for the elastic force to work, an incised part 323 is provided in the insertion hole 321 in the longitudinal direction.

The connection rail member 320 is inserted into the embedding groove 312 from a side of the rear cover 310 in a sliding manner, and then embedded therein. A blocking part 315 is provided at an edge of the embedding groove 312 to block an end part of the connection rail member 320 embedded, so that the connection rail member 320 is not separated from the embedding groove 312.

The connection pin member 350 electrically connects two adjacent power supply modules 300 to each other, so that power is supplied between the power supply modules 300 and control signals are communicated.

By having two cords for power supply and one cord for communication of control signals, the connection pin member 350 utilizes three cords in total.

The connection pin member 350 is connected to an injection block 351 so that three cords of the connection pin member are handled as one component and may be easily connected to and separated from the two power supply modules 300. The three cords of the connection pin member 350 and the injection block 351 may be integrally coupled by insert injection molding, or after the injection block 351 is manufactured separately, the connection pin member 350 may be inserted through the injection block 351 and coupled by assembly.

The connection board 330 serves as a relay for electrically connecting the connection rail member 320 and the PCB 133 provided in the body 110.

The connection board 330 is coupled by bolts to the partition 311 of the rear cover 310.

The connection board 330 is provided with a through-hole 331 through which the tension connecting plate 137 of the PCB 133 passes. The tension connecting plate 137 passes through the through-hole 331 to be electrically connected to an inner surface of the connection board 330.

The inner surface of the connection board 330 is provided with a pogo pin member 333 in contact with the connection rail member 320 to be electrically connected. The pogo pin member 333 is provided with a terminal which is elastically supported by a spring to maintain a stable contact state with the connection rail member 320 even when vibration or shock is applied. The pogo pin member 333 may be installed on the connection rail member 320 instead of the connection board 330, and an elastically supporting terminal may be contacted to the connection board 330.

In order to supply power to the power supply module 300 and communicate control signals, a dummy housing 360 may be used.

The dummy housing 360 is coupled to the bracket 200 in the same manner as the body 110.

The dummy housing 360 is connected to a power cable 361 for supplying power, and a communication cable 363 for transmitting control signals.

Inside the dummy housing 360, a power board for receiving power through the power cable 361 and transmitting the power to the power supply module 300 is embedded therein, and a communication board for receiving control signals through the communication cable 363 and transmitting the signals to the power supply module 300 is embedded therein.

The power board and the communication board of the dummy housing 360 are electrically connected to the connection rail member 320 of the power supply module 300 provided in the adjacent body 110 through the connection pin member 350, so that the power is supplied through the power cable 361 and the control signals are communicated through the communication cable 363.

For reference, in some cases, the power cable 361 and the communication cable 363 may be directly connected to the power supply module 300 without using the dummy housing 360.

In the above description of the present invention, the power supply device for the lighting device composed of the plurality of unit lighting modules having a specific shape and structure has been described with reference to the accompanying drawings. However, the present invention can be variously modified and changed by those skilled in the art, and such modifications and variations should be interpreted as falling within the protective scope of the present invention.

What is claimed is:

1. A power supply device for supplying power to a lighting device for a vehicle composed of a plurality of unit lighting modules, the power supply device comprising:
    a connection rail member provided in the each unit lighting module to supply the power to a PCB of the unit lighting module; and
    a connection pin member coupled to the connection rail member in a male and female manner and electrically connecting two adjacent power supply modules to each other.

2. The power supply device of claim 1, further comprising:
- a rear cover coupled to a body of the unit lighting module and having the connection rail member embedded therein; and
- a connection board provided on the rear cover and electrically connecting the connection rail member and the PCB to each other.

3. The power supply device of claim 1, wherein the connection rail member is provided with an insertion hole in which the connection pin member is inserted and coupled in the male and female manner, and an incised part is provided in the insertion hole in a longitudinal direction so that the connection rail member and the connection pin member are in close contact with each other by elastic force.

4. The power supply device of claim 1, further comprising a dummy housing to which a power cable for supplying the power through the connection pin member is connected.

5. The power supply device of claim 4, wherein the dummy housing is connected to a communication cable for communicating a control signal through the connection pin member.

\* \* \* \* \*